United States Patent [19]

Ohta et al.

[11] Patent Number: 5,151,955
[45] Date of Patent: Sep. 29, 1992

[54] OPTICAL ISOLATOR

[75] Inventors: Hiroshi Ohta; Noriyuki Nakamura, both of Kanagawa, Japan

[73] Assignee: Kabushiki Kaisha Shinkosha, Tokyo, Japan

[21] Appl. No.: 612,016

[22] Filed: Nov. 9, 1990

[30] Foreign Application Priority Data

Jun. 20, 1990 [JP] Japan ................................. 2-160017
Oct. 12, 1990 [JP] Japan ................................. 2-272335

[51] Int. Cl.⁵ ............................................. G02B 6/26
[52] U.S. Cl. ........................................... 385/6; 385/4; 385/11; 359/281; 359/282
[58] Field of Search .................. 350/96.15, 96.18, 375, 350/377; 385/4, 6, 11, 33; 359/281, 282

[56] References Cited

U.S. PATENT DOCUMENTS

| 4,178,073 | 12/1979 | Uchida et al. ................... 350/151 |
| 4,239,329 | 12/1980 | Matsumoto ..................... 350/96.15 |
| 4,541,691 | 9/1985 | Buzak ............................. 350/377 X |
| 4,865,429 | 9/1989 | Takeda et al. ..................... 350/375 |
| 4,893,890 | 1/1990 | Lutes ............................... 385/33 X |

OTHER PUBLICATIONS

Shirasaki et al, "Compact optical isolator for fibers using birefringent wedges", Applied Optics (Dec. 1982) v. 21, No. 23, pp. 4296 to 4299.

Chang et al, "Polarization Independent Isolator Using Spatial Walkoff Polarizers", IEEE Photonics Technology Letter (Mar. 1989) v. 1, No. 3, pp. 68 to 70.

Primary Examiner—John D. Lee
Assistant Examiner—S. W. Barns
Attorney, Agent, or Firm—Jordan and Hamburg

[57] ABSTRACT

An optical isolator having three or four birefringent crystals and two magneto-optic elements is disposed between two light waveguides to prevent reverse-directed light from returning to the light waveguide on the light-source side. Forward-directed light emitted from the light waveguide on the light-source side is allowed to properly enter into the other light waveguide, whereas the reverse-directed light returning reflectively toward the light waveguide on the light-source side is separated into two polarized component and undergoes polarization rotation while propagating in the optical isolator, to thereby advance out of the optical axis of the light-source side light waveguide.

2 Claims, 3 Drawing Sheets

OPTICAL ISOLATOR

BACKGROUND OF THE INVENTION

This invention relates to a polarization independent optical isolator.

Conventional polarization independent optical isolators which are believed to be relevant to this invention have been hitherto proposed in, for example, Japanese Pat. Publication No. SHO 58-28561(B) (corresp. to U.S. Pat. No. 4,239,329) and Japanese Pat. Publication No. SHO 60-49297(B) (corresp. to U.S. Pat. No. 4,178,073).

One example of the prior art optical isolator noted above will be described hereinafter with reference to the schematic diagram of FIG. 1. As illustrated in FIG. 1(A), the conventional optical isolator comprises two birefringent crystals 1, 2 having the same thickness, one magneto-optic element 3 providing 45° of Faraday rotation, and an optically active crystal 4 whose optical axis and thickness are so determined that the direction of polarization of the light transmitting through the optically active crystal is shifted by 45° relative to that of the light incident thereon. The optical isolator is disposed between two optical fibers 5 and 6.

The light emitted from the optical fiber 5 passes through the first birefringent crystal 1 while separating polarized component thereof into ordinary and extraordinary rays. Subsequently, the two polarized components thus separated transmit through the magneto-optic element 3 to thereby rotate the polarizations thereof by 45° in the counterclockwise direction as viewed from the optical fiber 6. The polarizations of these polarized components are further rotated by 45° while passing through the optically active crystal 4. Thereafter, the polarized components in the separate state pass through the second birefringent crystal 2 to be synthesized. The synthesized light finally enters into the optical fiber 6.

The light having two polarized components noted above reflectively emanates from the optical fiber 6 in a reverse direction and transmits through the second birefringent crystal 2 and the optically active crystal 4 while being subjected to polarization rotation in the same direction as that in which the forward-directed light advances. Nevertheless, the polarized components traveling in the reverse direction undergo 45° counterclockwise rotation of polarization as viewed from the optical fiber 6 by the magneto-optic element 3. As a result, the polarized components emanating from the magneto-optic element 3 are shifted by 90° relative to the forward-directed polarized components. Besides, the polarized components traveling in the reverse direction which have been subjected to polarization rotation are further separated by the first birefringent crystal 1 and enter into the optical fiber 5 along a path out of the light axis of the forward-directed light.

The changes in direction of polarization, which are effected in the light traveling from the optical fiber 5 to the optical fiber 6 at the positions P1, P2, P3, P4 and P5 in the forward direction, will be explained hereinbelow with reference to FIG. 1(B).

In the drawing, there are indicated a vertically polarized component F1 of the forward-directed light when entering into the first birefringent crystal 1 by the dotted line, a horizontally polarized component F2 by the solid line, the centers C1 and C2 of the polarized components by the black spots, and the center axis O of the incident light propagating forwardly by the circle.

The vertically polarized component F1 of the forward-directed light emitted from the optical fiber 5 and passing across the first birefringent crystal 1 advances straight as the ordinary ray. On the other hand, the horizontally polarized component F2 propagating as the extraordinary ray is shifted laterally by the first birefringent crystal 1. Thus, the center C2 of the polarized component F2 is deviated from the center C1 of the polarized component F1 as shown at the position P2.

The polarized components F1, F2 emanating from the first birefringent crystal 1 undergo 45° counterclockwise rotation as viewed from the optical fiber 6 when passing through the magneto-optic element 3. As a result, the polarized components F1, F2 are inclined respectively by 45° in opposite directions, as shown at the position P3.

The polarizations of these polarized components entering into the optically active crystal 4 are further rotated by 45° in opposite directions at the position P4. Consequently, the polarized components respectively become at right angles to those incident upon the first birefringent crystal 1 at the position P1.

Subsequently when the polarized components emanating from the optically active crystal 4 pass through the second birefringent crystal 2, the polarized component F1 is shifted in parallel and the component F2 advances straight, with the result that the centers C1 and C2 of the polarized components F1 and F2 coincide with each other at the position P5.

The polarized components F1a and F2a traveling in the reverse direction propagate, as shown in FIG. 1(C), from the position P5 to the position P3 via the position P4 in the same manner as the forward-directed polarized components F1 and F2, whereas these polarized components are subjected to 45° of polarization rotation by the magneto-optic element 3 as shown at the position P2. Thereafter, the centers C1a and C2a of the polarized components F1a and F2a are deviated from the center axis O at the position P1.

Since the center C1a of the polarized component F1a agrees with the center axis O at the positions P4, P3 and P2, the reverse-directed polarized components travel backward to the first birefringent crystal 1 along the center axis O of the forward-directed polarized components.

Accordingly, the performance of the conventional optical isolator is very dependent on the performance of the first birefringent crystal 1 and the mechanical accuracies of the birefringent crystals and magneto-optic element (particularly, the accuracy of the plane of polarization of the first birefringent crystal). In the optical isolator illustrated in FIG. 1, in order to heighten the effect of preventing the reverse-directed light from entering into the optical fiber 5 disposed on the light source side, it can be expected that a plurality of optical units each constituted by the two birefringent crystals 1, 2, one magneto-optic element 3 and one optically active crystal 4 as noted above are used in an optical system. Whereas, such an optical system would entail a disadvantage that it cannot be miniaturized and inevitably turns out to be expensive because the number of component elements is increased, though the desired effect may be somewhat improved according to the increase in number of optical units. Besides, since the returning light (reverse-directed light) travels along the center of the forward-directed light to the first birefringent crystal, the efficiency of propagating the light in the optical system is apt to be deteriorated.

One object of this invention is to provide an optical isolator having a structure capable of decreasing the number of constituent elements and being made compact. Another object of this invention is to provide an optical isolator having excellent efficiency and performance which are independent on mechanical accuracy of the component elements constituting an optical system. Still another object of this invention is to provide an excellent optical isolator capable of be manufactured at a low price.

SUMMARY OF THE INVENTION

To attain the objects described above according to this invention, there is provided an optical isolator comprising, in a row, one light waveguide, another light waveguide, plate-like first, second, third and fourth birefringent elements, a first magneto-optic element interposed between the first and second birefringent elements, and a second magneto-optic element interposed between the third and fourth birefringent elements.

The first birefringent element has a plane of polarization which is perpendicular to the light penetrating end face thereof and includes the direction in which light is separated so that light emitted from the aforementioned one light waveguide and being incident on the first birefringent element is separated into two polarized components. The plane of polarization of the second birefringent element is angled at nearly 45° relative to the aforementioned plane of polarization of the first birefringent element about the normal line of the light penetrating end face thereof. The plane of polarization of the third birefringent element is angled at nearly 45° relative to the aforementioned plane of polarization of the first birefringent element about the light penetrating end face thereof and substantially perpendicular to the plane of polarization of the aforesaid second birefringent element. The plane of polarization of the fourth birefringent element is angled at nearly 45° relative to that of the third birefringent element about the light penetrating end face thereof so as to synthesize two polarized components transmitted through the second magneto-optic element. The aforesaid planes of polarization of the second, third and fourth birefringent elements are substantially equal in structure to that of the first birefringent element.

The aforementioned first magneto-optic element functions to change the direction of polarization of the polarized components emitted from the aforementioned first birefringent element by the magnetic field applied thereto. The aforesaid second magneto-optic element functions to change the directions of polarization of the polarized components emitted from the aforesaid third birefringent element by the magnetic field applied thereto. The thicknesses of the first and second magneto-optic elements are so determined that the directions of polarization of the polarized components emanating from the first and second magneto-optic elements are angled at nearly 45° relative to those incident thereupon.

Another feature of the optical isolator according to this invention is to comprise, in a row, a pair of light waveguides, plate-like first, second and third birefringent elements, a first magneto-optic element interposed between the first and second birefringent elements, and a second magneto-optic element interposed between the second and third birefringent elements.

The first birefringent element has a plane of polarization which is perpendicular to the light penetrating end face thereof and includes the direction in which light incident thereupon is separated so that the light emitted from one of the aforementioned light waveguides and being incident on the first birefringent element is separated into two polarized components. The plane of polarization of the second birefringent element is angled at nearly 45° relative to that of the first birefringent element about the normal line of the light penetrating end face thereof. The plane of polarization of the third birefringent element is angled at nearly 45° relative to that of the second birefringent element about the light penetrating end face thereof and substantially perpendicular to that of the aforementioned second birefringent element so as to synthesize two polarized components transmitted through the second magneto-optic element.

The planes of polarization of the second and third birefringent elements are substantially equal in structure to that of the first birefringent element.

The aforementioned first magneto-optic element functions to change the directions of polarization of the polarized components emitted from the aforementioned first birefringent element by the magnetic field applied thereto. The aforementioned second magneto-optic element functions to change the directions of polarization of the polarized components emitted from the aforementioned second birefringent element by the magnetic field applied thereto. The thicknesses of the first and second magneto-optic elements are so determined that the directions of polarization of the polarized components emanating from the first and second magneto-optic elements are angled at nearly 45° relative to those incident thereupon.

The birefringent element in this invention may be of a birefringent element, dielectric multi-layer or the like.

The light waveguide used in this invention may be formed not only of an optical fiber, but also by heat-diffusing magnesium ion ($Mg^{2+}$) into a substrate of lithium niobate ($LiNbO_3$), for example.

The characteristic feature of this invention will become more apparent in the description taken in connection with the accompanying drawings.

DESCRIPTION OF THE PREFERRED EMBODIMENTS

Figure 1:
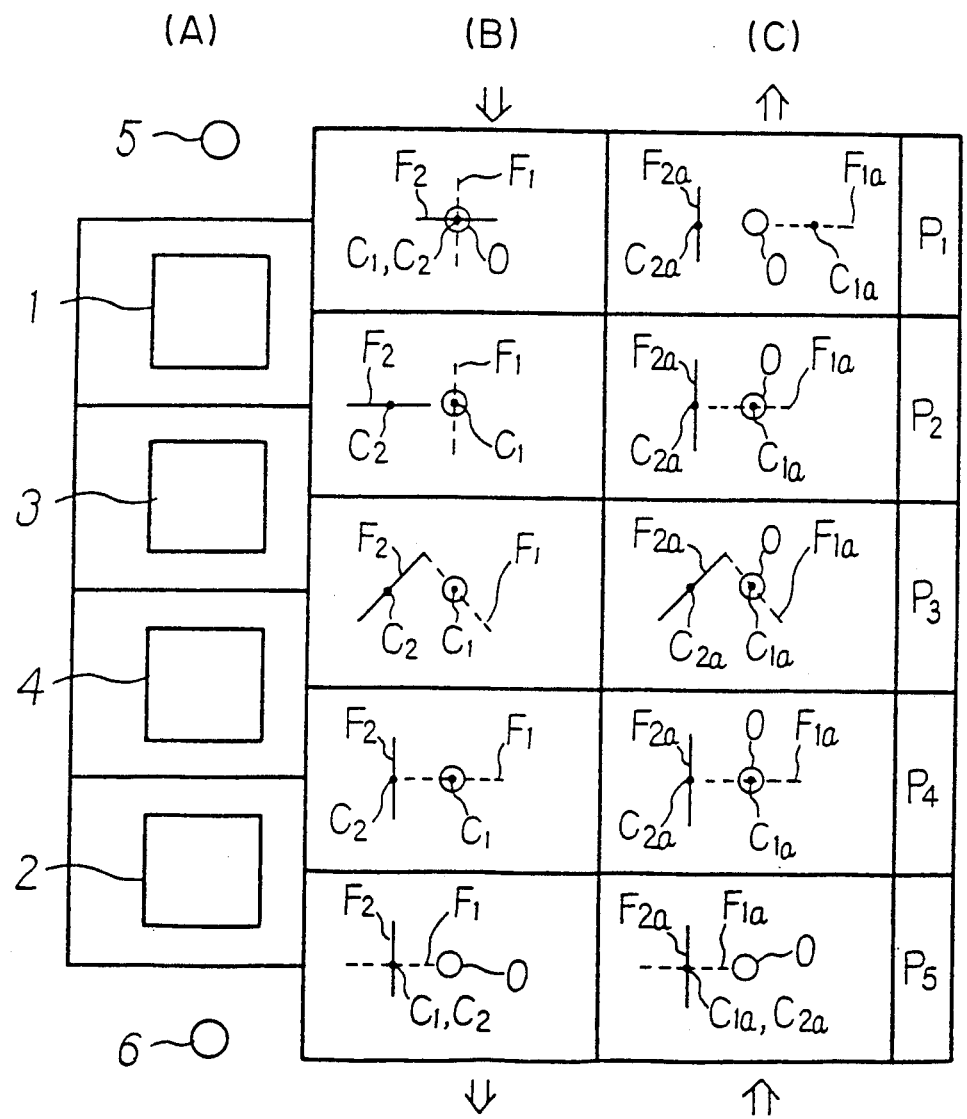
FIG. 1 is an explanatory diagram showing a prior art optical isolator, as viewed from an optical fiber 6.
Figure 2:
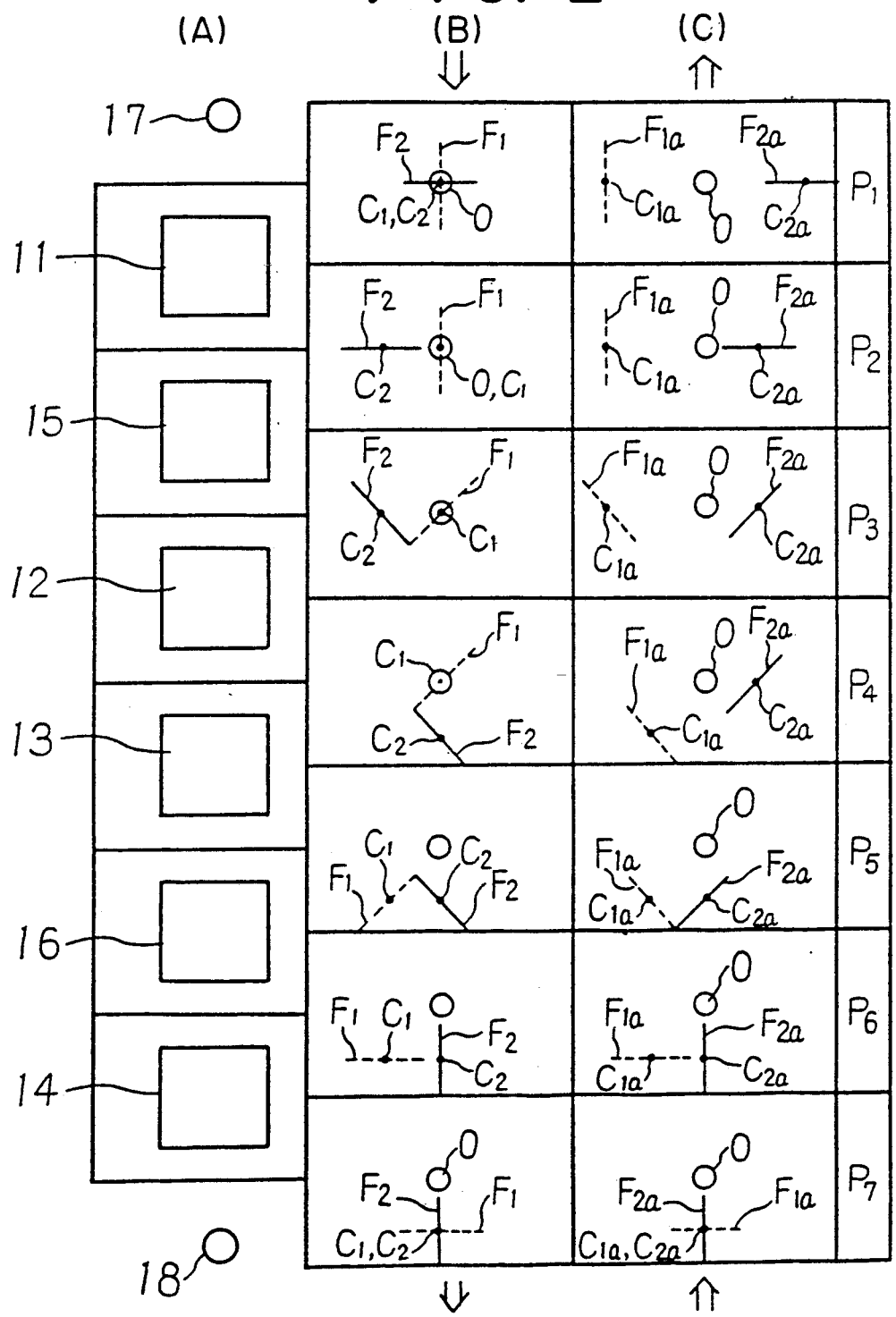
FIG. 2 is an explanatory diagram showing one embodiment the optical isolator according to this invention, viewed from an optical fiber 18.

The optical isolator according to this invention comprises, in combination, four plate-like birefringent crystals 11, 12, 13 and 14, and two magneto-optic elements 15 and 16 as shown in FIG. 2. In this embodiment, though the birefringent crystal as a birefringent element, this should not be understood as limitative. These constituent elements 11 to 16 are adjacently disposed between two opposite optical fibers 17 and 18 which serve as light waveguides. There are arranged the first birefringent crystal 11 disposed on the side of optical fiber 17, the first magneto-optic element 15, the second birefringent crystal 12, the third birefringent crystal 13, the second magneto-optic element 16 and the fourth birefringent crystal 14 in order in the direction of progress of forward-directed light from the optical fiber 17 toward the optical fiber 18 (downward in the drawing). The birefringent crystals 11 to 14 are made of rutile. Where the first and fourth birefringent crystals 11, 14 have a thickness of t, the second and third birefringent crystals 12, 13 have a thickness of $\sqrt{2}t$.

The plane of polarization of the first birefringent crystal 11 is perpendicular to the light penetrating end face thereof and includes the direction in which light is separated so that the light emitted from the optical fiber 17 and being incident on the first birefringent crystal 11 is separated into two polarized components. The planes of polarization of the second and third birefringent crystals 12, 13 (which planes are perpendicular to their light penetrating end faces and include the direction in which the light is separated) are substantially perpendicular to each other and respectively rotated by 45° relative to that of the first birefringent crystal 11 about the light penetrating end faces of the second and third birefringent crystals. The plane of polarization of the fourth birefringent crystal 14 (which plane is perpendicular to the light penetrating end face thereof and includes the direction in which the light is separated) is rotated by 45° relative to those of the second and third birefringent crystals 12, 13 about the light penetrating end face of the fourth birefringent crystal so as to be parallel to the plane of polarization of the first birefringent crystal 11.

The first and second magneto-optic elements 15, 16 are made of garnet and have a function of changing the direction of polarization of polarized component by the magnetic field. The thicknesses of the first and second magneto-optic elements 15, 16 are so determined that the directions of polarization of the polarized components emanating from the first and second magneto-optic elements are angled at nearly 45° relative to those incident thereupon.

Next, the function of the optical isolator noted above will be described.

Light from a light source is first introduced from the optical fiber 17 into the first birefringent crystal 11, to thereby separate the polarized component of the light into an ordinary ray and an extraordinary ray. The polarized components thus separated undergo 45° clockwise rotation as viewed from the optical fiber 18 to rotate the directions of polarization thereof while passing through the first magneto-optic element 15, and are further shifted laterally by the second and third birefringent crystals 12, 13. The polarized components thus shifted laterally are subjected to 45° of polarization rotation when passing through the second magneto-optic element 16. The two polarized components which emanate from the second magneto-optic element are synthesized by the fourth birefringent crystal 14 and enter into the aforenoted optical fiber 18.

Returning (reverse-directed) light reflectively emitted from the optical fiber 18 passes through the fourth birefringent crystal 14, consequently to be separated into ordinary and extraordinary rays. The reverse-directed rays thus separated are subjected to 45° of polarization rotation when passing through the second magneto-optic element 16, and then, shifted laterally by the third and second birefringent crystals 13, 12. After only one of the polarized components is laterally shifted, the polarizations of the both components are further rotated by 45° while passing through the first magneto-optic element 15. The polarized components incident upon the first birefringent crystal 11 are not synthesized, but advance along the respective paths apart from the center axis of the forward-directed light toward the optical fiber 17.

The changes in direction of polarization of the polarized components traveling from the optical fiber 17 to the optical fiber 18 at the position P1, P2, P3, P4, P5, P6 and P7 are shown in FIG. 2(B), and those of the reverse-directed polarized components advancing backward are shown in FIG. 2(C).

While transmitting the light emitted from the optical fiber 17 through the first birefringent crystal 11, the aforementioned ordinary ray referred to as a vertically polarized component F1 advances straight inside the first birefringent crystal 11, and on the other hand, the extraordinary ray referred to as a horizontally polarized component F2 is shifted in parallel. As a result, the center C1 of the polarized component F1 is deviated from the center C2 of the component F2 at the position P2.

As shown at the position P3, the polarized components F1 and F2 emanating from the first birefringent crystal 11 respectively undergo 45° polarization rotation when passing through the first magneto-optic element 15.

As shown at the position P4, the polarized component F2 of the light incident upon the second birefringent crystal 12 is shifted in parallel, and at the position P5, the polarized component F2 of the light incident on the third birefringent crystal 13 advances straight, and the polarized component F1 is shifted in parallel.

As shown at the position P6, the polarizations of the polarized components F1 and F2 are further rotated by 45° by the Faraday effect brought about by the second magneto-optic element 16. The polarized components F1 and F2 which are emanated from the fourth birefringent crystal 14 and intended to enter into the optical fiber 18 are mated with each other at the position P7.

The returning light which is reflectively emanated from the optical fiber 18 in the reverse direction undergoes a change in direction of polarization as described below.

As shown at the positions P7 and P6, while passing the reverse-directed light composed of polarized components F1a and F2a emitted from the optical fiber 18, the center C1a of the polarized component F1a is shifted by the fourth birefringent crystal 14.

When the polarized components F1a and F2a enter into the second magneto-optic element 16, these polarized components respectively undergo 45° polarization rotation as shown at the position P5, with the result that the directions of polarization of the components are angled at 90° relative to the polarized components F1 and F2 of the forward-directed light.

Thereafter, when the polarized components enter into the third birefringent crystal 13, the polarized component F1a advances straight, and the polarized component F2a is shifted to move the center C2a thereof, as shown at the position P4.

When the polarized components enter into the second birefringent crystal 12, the polarized component F2a advances straight, and the polarized component F1a is shifted to move the center C1a thereof, as shown at the position P3.

The polarizations of the polarized components F1a and F2a entering into the first magneto-optic element 15 are respectively rotated by 45° as shown at the position P2, and then, when the both polarized components enter into the first birefringent crystal 11, the polarized component F1a advances straight, and the polarized component F2a is shifted in parallel to move the center C2a thereof, as shown at the position P1.

Between the center axis O and the reverse-directed polarized components F1a and F2a, there exists a relation such that the centers C1a and C2a of the polarized components F1a and F2a traveling from the position P7 to the position P1 never pass across the center axis O over the length of the optical path noted above. The distances of the centers C1a and C2a of the polarized components F1a and F2a from the center axis O increase going from the position P7 toward the position P1.

Thus, the optical isolator of this embodiment noted above can be stably performed because the reverse-directed light does not pass across the center axis of the forward-directed light.

Next, an optical isolator of another embodiment according to this invention will be described.

Figure 3:
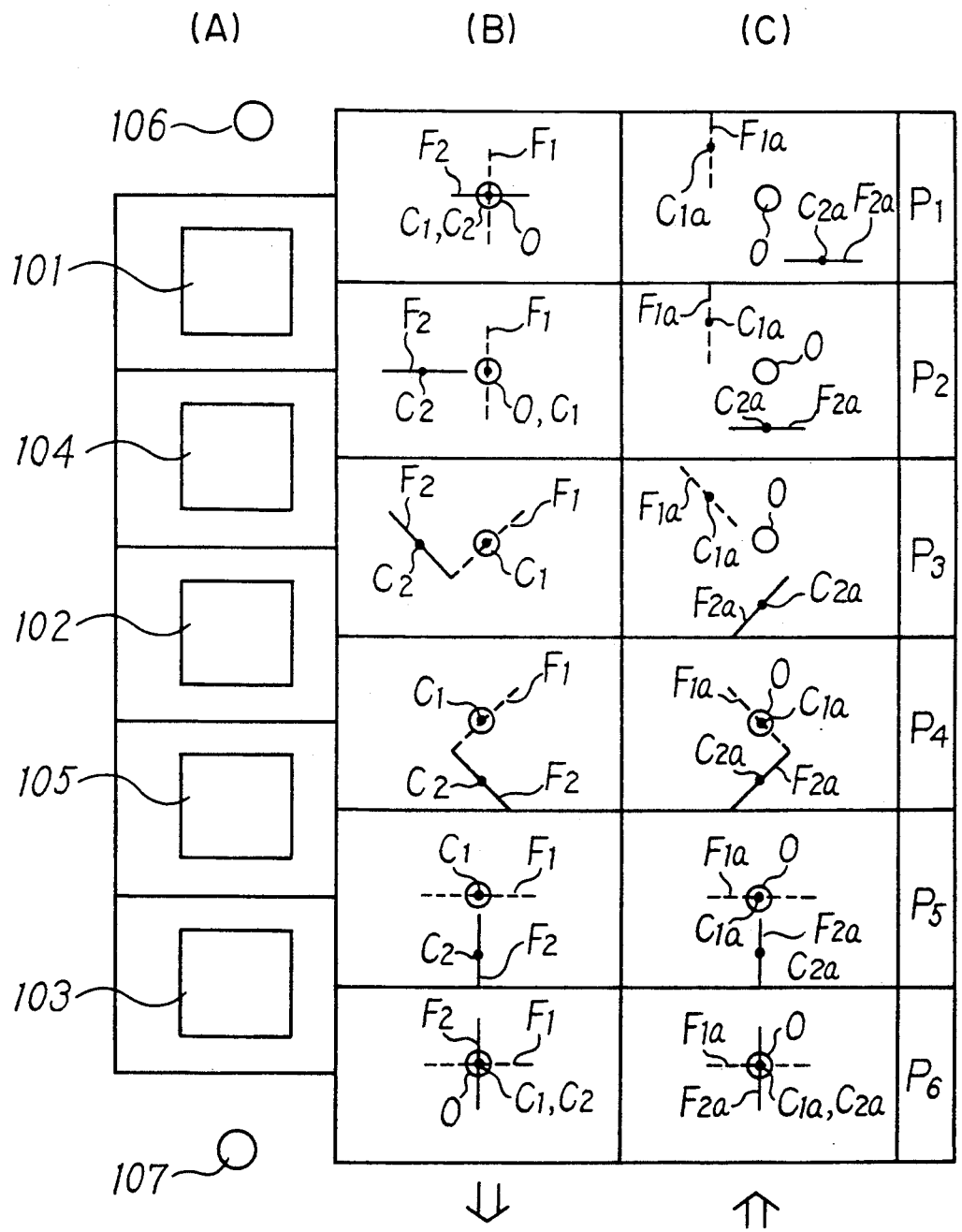
FIG. 3 is an explanatory diagram showing another embodiment of the optical isolator according to this invention, as viewed from an optical fiber 107.

The optical isolator of this embodiment shown in FIG. 3 has the same structure as that shown in FIG. 2 except for the third birefringent crystal 13 as specified above.

In the optical isolator illustrated in FIG. 3, between one optical fiber 106 and another optical fiber 107, there are disposed, in a row, a plate-like first birefringent crystal 101, second birefringent crystal 102, and third birefringent crystal 103. Between the first and second birefringent crystals 101 and 102, a first magneto-optic element 104 is interposed. Between the second and third birefringent crystals 102 and 103, a second magneto-optic element 105 is interposed.

The first, second and third birefringent crystals 101 through 103 are made of rutile. Where the first and third birefringent crystals 101, 103 have a thickness of t, the second birefringent crystal 102 has a thickness of $\sqrt{2}t$.

The first birefringent crystal 101 has a plane of polarization (perpendicular to the light penetrating end face thereof and includes the direction in which light incident thereupon is separated), so that the light which is transmitted across the optical fiber 106 and enters into the first birefringent crystal 101 is separated into two polarized components.

The plane of polarization of the second birefringent crystal 102 is angled at nearly 45° relative to that of the first birefringent crystal 101 about the normal line of the light penetrating end face thereof.

The plane of polarization of the third birefringent crystal 103 is angled at nearly 45° relative to that of the second birefringent crystal 102 about the light penetrating end face thereof and at 90° relative to that of the first birefringent crystal 101. The third birefringent crystal 103 has a function of synthesizing two polarized components transmitted through the second magneto-optic element 105.

The first and second magneto-optic elements 104, 105 are made of garnet. The first magneto-optic element 104 functions to change the directions of polarization of the polarized components emitted from the first birefringent crystal 101 by the magnetic field applied thereto. The second magneto-optic element 105 functions to change the directions of polarization of the polarized components emitted from the second birefringent crystal 102 by the magnetic field applied thereto. The thicknesses of the first and second magneto-optic elements 104 and 105 are so determined that the directions of polarization of the polarized components emanating from the first and second magneto-optic elements are angled at nearly 45° relative to those incident thereupon.

The function of the optical isolator according to this embodiment will be explained hereinbelow.

The light from a light source is first emitted from the optical fiber 106 into the first birefringent crystal 101 so as to separate the polarized component of the light into an ordinary ray and an extraordinary ray. While transmitting the polarized components through the first magneto-optic element 104, the polarizations of the polarized components are rotated by 45° in the clockwise direction as viewed from the optical fiber 107. Then, the polarized components enter into the second birefringent crystal 102 to shift one of the polarized components laterally and pass through the second magneto-optic element 105, rotating the polarizations thereof by 45°. The polarized components emanating from the second magneto-optic element 105 are synthesized while passing through the second birefringent crystal 103 and enter into the optical fiber 107.

The returning (reverse-directed) light reflectively emitted from the optical fiber 107 passes through the third birefringent crystal 103, consequently to be separated into two polarized components. The polarized components thus separated are subjected to 45° of polarization rotation when passing through the second magneto-optic element 105, and then, shifted laterally when passing through the second birefringent crystal 102. The polarizations of the both polarized components are further rotated by 45° while passing through the first magneto-optic element 104. The polarized components incident upon the first birefringent crystal 101 advance along the respective paths apart from the center axis of the forward-directed light toward the optical fiber 106.

The changes in direction of polarization of the polarized components traveling from the optical fiber 106 to the optical fiber 107 at the position P1, P2, P3, P4, P5 and P6 are shown in FIG. 3(B), and those of the reverse-directed light advancing backward are shown in FIG. 3(C).

As shown at the positions P1 and P2, when passing the forward-directed light emitted from the optical fiber 106 through the first birefringent crystal 101, an ordinary ray referred to as a vertically polarized component F1 advances straight in the first birefringent crystal 101, and on the other hand, an extraordinary ray referred to as a horizontally polarized component F2 is shifted in parallel. As a result, the center C1 of the polarized component F1 is deviated from the center C2 of the component F2.

As shown at the position P3, the polarized components F1 and F2 emanating from the first birefringent crystal 101 respectively undergo 45° polarization rotation when passing through the first magneto-optic element 104.

As shown at the position P4, the polarized component F1 of the light incident upon the second birefringent crystal 102 advances straight, and the polarized component F2 is shifted in parallel.

At the position P5, the polarizations of the polarized components F1 and F2 are further rotated by 45° by the Faraday effect brought about by the second magneto-optic element 105. Then, the centers C1 and C2 of the polarized components F1 and F2 are mated with each other on the center axis O by the action of the second birefringent crystal 103 at the position P6.

The returning light which is reflectively emanated from the optical fiber 107 in the reverse direction undergoes a change in direction of polarization as described below.

As shown at the positions P6 and P5, while passing the reverse-directed light through the third birefringent crystal 103, the center C2a of the polarized component F2a is shifted by the third birefringent crystal 103.

As shown at the position P4, when the polarized components F1a and F2a enter into the second magneto-optic element 105, these components respectively undergo 45° polarization rotation, with the result that the directions of polarization of the components are angled at 90° relative to the polarized components F1 and F2 of the forward-directed light.

Thereafter, when the polarized components enter into the second birefringent crystal 102, the polarized component F2a advances straight, and on the other hand, the polarized component F1a is shifted in parallel to move the center C1a thereof, as shown at the position P3.

The polarizations of polarized components F1a, F2a entering into the first magneto-optic element 104 are respectively rotated by 45° as shown at the position P2, and then, when the polarized components enter into the first birefringent crystal 101, the polarized component F1a advances straight and the polarized component F2a is shifted in parallel to move the center C2a thereof, as shown at the position P1.

Between the center axis O and the reverse-directed polarized components F1a and F2a, there exists a relation such that the centers C1a and C2a of the polarized components F1a and F2a traveling from the position P3 to the position P1 never pass across the center axis O over the length of the optical path noted above. The distances of the centers C1a and C2a of the polarized components F1a and F2a from the center axis O increase going from the position P6 toward the position P1.

According to this embodiment, since the forward-directed light transmitting through the third birefringent crystal 103 is placed on the center axis, alignment of the center axis of the forward-directed light with the centers of light waveguides can be easily accomplished.

What is claimed is:

1. An optical isolator comprising:
   a pair of light waveguides;
   plate-like first, second, third and fourth birefringent elements;
   a first magneto-optic element interposed between said first and second birefringent elements; and
   a second megneto-optic element interposed between said third and fourth birefringent elements,
   said first birefringent element having a light penetrating end face and a plane of polarization which is perpendicular to said light penetrating end face and including a direction in which light is separated so that light emitted from one of said light waveguides and being incident on said first birefringent element is separated into two polarized components,
   said second birefringent element having a light penetrating end face and a plane of polarization which is angled at nearly 45° relative to that of said first birefringent element about the normal line of said light penetrating end face of said second birefringent element,
   said third birefringent element having a light penetrating end face and a plane of polarization which is angled at nearly 45° relative to that of said first birefringent element about said light penetrating end face of said third birefringent element and substantially perpendicular to that of said second birefringent element,
   said fourth birefringent element having a light penetrating end face and a plane of polarization which is angled at nearly 45° relative to that of said third birefringent element about said light penetrating end face of said fourth birefringent element so as to synthesize two polarized components transmitted across said second magneto-optic element,
   said first magento-optic element being disposed to magnetically change directions of polarization of said polarized components transmitted across said first birefringent element,
   said second magneto-optic element being disposed to magnetically change directions of polarization of said polarized components transmitted across said third birefringent element,
   said first and second magneti-optic elements having a thickness which is so determined that said directions of polarization of said polarized components emanating from said first and second magneto-optic elements are angled at nearly 45° relative to those incident thereupon, and
   said first and fourth birefringent elements being equal in thickness and said second and third birefringent elements having a thickness $\sqrt{2}$ times that of said first or fourth birefringent element.

2. An optical isolator comprising:
   a pair of light waveguides;
   plate-like first, second and third birefringent elements;
   a first magneto-optic element interposed between said first and second birefringent elements; and
   a second magneto-optic element interposed between said second and third birefringent elements,
   said first birefringent element having a light penetrating end face and a plane of polarization which is perpendicular to said light penetrating end face and includes a direction in which light is separated so that light emitted from one of said light waveguides and being incident on said first birefringent element is separated into two polarized components,
   said second birefringent element having a light penetrating end face and a plane of polarization is angled at nearly 45° relative to that of said second birefringent element about the normal line of said light penetrating end face of said third birefringent elements,
   said third birefringent element having a light penetrating end face and a plane of polarization is angled at nearly 45° relative to that of said second birefringent element about said light penetrating end face of said third birefringent element and substantially perpendicular to that of said second birefringent element so as to synthesize two polarized components transmitted across said second magneto-optic element,
   said first magneto-optic element being disposed to magnetically change directions of polarization of said polarized components transmitted across said first birefringent element, said second magneto-optic element being disposed to magnetically change directions of polarization of said polarized components transmitted across said second birefringent element, said first and second magneto-optic elements having a thickness which is so determined that the directions of polarization of said polarized components emanating from said first and second magneto-optic elements are angled at nearly 45° relative to those incident thereupon, and said first and third birefringent elements being equal in thickness and said second birefringent element having a thickness $\sqrt{2}$ times that of said first or third birefringent element.

* * * * *